(12) United States Patent
Muehge et al.

(10) Patent No.: US 12,437,198 B2
(45) Date of Patent: Oct. 7, 2025

(54) CLASSIFICATION OF A NON-MONETARY DONATION BASED ON MACHINE LEARNING

(71) Applicant: INTERNATIONAL BUSINESS MACHINES CORPORATION, Armonk, NY (US)

(72) Inventors: Thorsten Muehge, Budenheim (DE); Erik Rueger, Ockenheim (DE); Markus Ettl, Yorktown Heights, NY (US); Beverley Joanne Dyke, London (GB); Thomas William Moncreaff, Emsworth (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1140 days.

(21) Appl. No.: 16/935,538

(22) Filed: Jul. 22, 2020

(65) Prior Publication Data

US 2022/0027682 A1   Jan. 27, 2022

(51) Int. Cl.
*G06N 3/082*   (2023.01)
*G06F 18/20*   (2023.01)
(Continued)

(52) U.S. Cl.
CPC ......... *G06N 3/082* (2013.01); *G06F 18/2113* (2023.01); *G06F 18/217* (2023.01);
(Continued)

(58) Field of Classification Search
None
See application file for complete search history.

(56) References Cited

U.S. PATENT DOCUMENTS 8,751,265 B2   6/2014  Piett
8,788,247 B2   7/2014  Lee
(Continued)

FOREIGN PATENT DOCUMENTS

CN      110147929 A     8/2019
KR   000101860258 B1    5/2018
(Continued)

OTHER PUBLICATIONS

Prellberg et al., "Lamarckian Evolution of Convolutional Neural Networks", 2018, arXiv:1806.08099v2 [cs.NE], 12 pages (Year: 2018).*

(Continued)

*Primary Examiner* — Abdullah Al Kawsar
*Assistant Examiner* — Asher H. Jablon
(74) *Attorney, Agent, or Firm* — Rakesh Roy

(57) ABSTRACT

The present disclosure relates to a method for classifying a non-monetary donation. The method comprises: training a machine learning model comprising input neurons arranged in an input layer, each input neuron being operable for inputting an input value ($X_n$) of a parameter of the donation, and at least one hidden layer comprising multiple hidden neurons, each hidden neuron being operable for calculating a hidden layer value based on at least one input value and weights ($w(X_n, Y_m)$) associated with the respective input neurons. The number of input parameters may be reduced based on ranking the weights ($w(X_n, Y_m)$) related to the individual input parameters. The number of neurons of the hidden layer may be reduced based on ranking the weights related to the individual neurons of the hidden layer. The trained model, the reduced input parameters, and reduced hidden neurons may be provided for enabling the classification using the trained model.

6 Claims, 6 Drawing Sheets

(51) Int. Cl.
  *G06F 18/21*    (2023.01)
  *G06F 18/2113*  (2023.01)
  *G06F 18/2415*  (2023.01)
  *G06N 3/045*    (2023.01)
  *G06N 3/08*     (2023.01)
  *G06N 20/00*    (2019.01)

(52) U.S. Cl.
  CPC ........ *G06F 18/2415* (2023.01); *G06F 18/285* (2023.01); *G06N 20/00* (2019.01); *G06N 3/08* (2013.01)

(56) References Cited

U.S. PATENT DOCUMENTS

| | | | |
|---|---|---|---|
| 2013/0173457 A1 | 7/2013 | Chrapko | |
| 2019/0244318 A1* | 8/2019 | Rajcok | H04W 4/40 |
| 2020/0104717 A1* | 4/2020 | Alistarh | G06N 3/045 |
| 2020/0134544 A1* | 4/2020 | Ripley | G06Q 10/30 |
| 2020/0342380 A1* | 10/2020 | Selina | G06Q 10/06315 |

FOREIGN PATENT DOCUMENTS

| | | |
|---|---|---|
| WO | 2003042791 A2 | 5/2003 |
| WO | 2016082263 A1 | 6/2016 |
| WO | 2018170593 A1 | 9/2018 |

OTHER PUBLICATIONS

Farrokhvar et al., "Predictive models for charitable giving using machine learning techniques", https://journals.plos.org/plosone/article?id=10.1371/journal.pone.0203928, Oct. 3, 2018, pp. 1-9.

Islam, "In-Kind Donation Practices, Challenges and Strategies for NGOs and Donors", Dec. 2013, https://smartech.gatech.edu/bitstream/handle/1853/50332/ISLAM-DISSERTATION-2013.pdf, pp. 1-166.

Ruiz-Brand, "A Decision Support Tool for Accepting or Rejecting Donations in Humanitarian Relief Organizations", Scholar Commons, https://scholarcommons.usf.edu/cgi/viewcontent.cgi?article=2226&context=etd, Jun. 30, 2004, pp. 1-142.

* cited by examiner

| Validation | Category | Type | SC | Transport | DDM | EDM | TO |
|---|---|---|---|---|---|---|---|
| y1= 1 | 1 | 4 | 5000 | 1 | 1 | 1 | 300 |
| y2= 1 | 2 | 2 | 1050 | 1 | 0 | 1 | 100 |
| 1 | 4 | 4 | 500 | 1 | 0 | 1 | 900 |
| 1 | 3 | 3 | 10000 | 1 | 1 | 1 | 100 |
| 1 | 2 | 1 | 500 | 1 | 0 | 1 | 50 |
| 0 | 4 | 4 | 1 | 0 | 1 | 1 | 900 |
| 0 | 1 | 1 | 10000 | 0 | 1 | 1 | 9000 |
| 0 | 2 | 2 | 10 | 0 | 1 | 1 | 300 |
| 0 | 3 | 3 | 20 | 0 | 1 | 1 | 200 |
| yp= 0 | 2 | 1 | 5 | 0 | 1 | 1 | 300 |

Fig. 5A

|      | [,1]         | [,2]        | [,3]        | [,4]        | [,5]       | [,6]       | [,7]       |
|------|--------------|-------------|-------------|-------------|------------|------------|------------|
| [1,] | -0.546870268 | 1.0017627   | -1.100032   | 0.73219181  | -0.6485596 | 1.40804872 | 0.6306446  |
| [2,] | -0.165058979 | 2.0454239   | -2.166988   | -0.95851172 | 0.3105835  | 1.42933079 | -0.7234132 |
| [3,] | 0.274567170  | 0.4385879   | -2.305042   | 0.45440666  | 1.7203306  | 0.71438844 | -0.6002527 |
| [4,] | 1.153282001  | 0.0528249   | -3.485362   | -0.05434007 | 0.1180117  | 0.08932748 | 1.2445516  |
| [5,] | 0.487258369  | -1.6870481  | 2.062141    | -0.26817874 | 4.7549021  | 0.34766283 | 2.2322800  |
| [6,] | 0.514831868  | -0.2433307  | -2.121166   | 1.13809048  | 1.7715878  | 0.96090658 | -2.2502864 |
| [7,] | -0.008710448 | 1.9715775   | -2.365618   | 1.86735014  | 0.6777329  | 0.31496956 | -0.1421209 |

|      | [,8]        | [,9]        | [,10]       |
|------|-------------|-------------|-------------|
| [1,] | -2.1375854  | 1.98092747  | -1.12900041 |
| [2,] | -3.1570184  | -0.02716093 | -1.39961718 |
| [3,] | -2.3803571  | 2.17104887  | -0.01179417 |
| [4,] | -2.9485365  | -0.24675007 | 1.10552357  |
| [5,] | 0.6785164   | -2.18007519 | 0.92100510  |
| [6,] | -2.1339907  | 1.11030492  | -0.40911112 |
| [7,] | -1.9726067  | 0.93502880  | -0.84462622 |

CLASSIFICATION OF A NON-MONETARY DONATION BASED ON MACHINE LEARNING

BACKGROUND

The present invention relates to the field of digital computer systems, and more specifically, to a method for classifying a proposed non-monetary donation.

A donation may take various forms, including money, alms, services, or goods such as clothing, toys, food, or vehicles. When regions are hit by natural disasters a massive demand occurs instantaneously and a large number of people and enterprises donate, for example, non-monetary materials, goods and services. However, computer-processable data associated with these donations needs to be technically processed in time and in an efficient way in order to select the needed donations during the disaster.

SUMMARY

Various embodiments provide a method for classifying a proposed non-monetary donation, computer system and computer program product as described by the subject matter of the independent claims. Advantageous embodiments are described in the dependent claims. Embodiments of the present invention can be freely combined with each other if they are not mutually exclusive.

In one aspect, the invention relates to a method for classifying a proposed non-monetary donation. The method includes training a machine learning model. The machine learning model comprises input neurons arranged in an input layer and at least one hidden layer comprising multiple hidden neurons. Each input neuron is operable for inputting an input value (Xn) of a parameter of the donation. Each hidden neuron is operable for calculating a hidden layer value based on at least one input value and weights (w(Xn, Ym)) associated with the respective input neurons. The method also includes reducing the number of input parameters based on ranking the weights (w(Xn, Ym)) related to the individual input parameters. In addition, the method includes reducing the number of neurons of the hidden layer based on ranking the weights related to the individual neurons of the hidden layer, and providing the trained model, the reduced input parameters, and the reduced hidden neurons for enabling the classification using the trained model.

In another aspect, the invention relates to a computer program product comprising a computer-readable storage medium having computer-readable program code embodied therewith, the computer-readable program code configured to implement steps of the method as described herein.

In another aspect, the invention relates to a computer system for classifying a proposed non-monetary donation. The computer system comprises one or more processors, one or more computer-readable memories, one or more computer-readable tangible storage devices, and program instructions stored on at least one of the one or more storage devices for execution by at least one of the one or more processors via at least one of the one or more memories. The computer system executes the program instructions to perform a method. The method includes training a machine learning model. The machine learning model comprises input neurons arranged in an input layer and at least one hidden layer comprising multiple hidden neurons. Each input neuron is operable for inputting an input value (Xn) of a parameter of the donation. Each hidden neuron is operable for calculating a hidden layer value based on at least one input value and weights (w(Xn, Ym)) associated with the respective input neurons. In addition the method includes reducing the number of input parameters based on ranking the weights (w(Xn, Ym)) related to the individual input parameters. The method also includes reducing the number of neurons of the hidden layer based on ranking the weights related to the individual neurons of the hidden layer, and providing the trained model, the reduced input parameters, and the reduced hidden neurons for enabling the classification using the trained model.

BRIEF DESCRIPTION OF THE SEVERAL VIEWS OF THE DRAWINGS

The following embodiments of the invention are explained in greater detail, by way of example only, making reference to the drawings in which:

FIG. 5A shows a training set in accordance with an example of the present subject matter.

DETAILED DESCRIPTION

Figure 1:
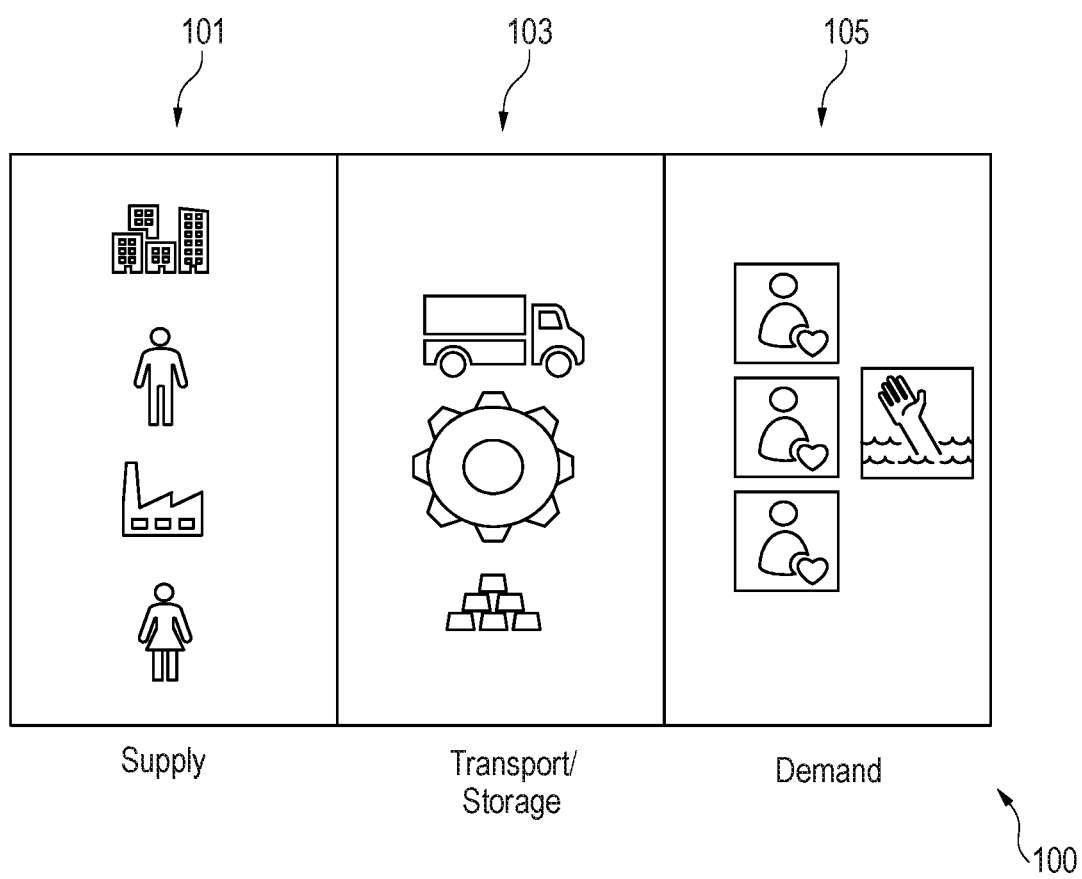
FIG. 1 is a block diagram of a system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

During a disaster, a supply chain may be established engaging as many public and private entities as possible. The supply from these entities, may however, be random and unpredictable. The supply may need to be managed and controlled. The present subject matter may solve this by an automatic and timely efficient classification of the donations. The classification may enable (e.g., the user(s)) to select the needed donations and to provide them in time. The present subject matter may, for example, be used to improve the process of non-monetary donation management and may be implemented within any disaster recovery ecosystem. In particular, specialized software programs for performing accounting and donation management tasks for non-profit organizations are known. Donor management tasks may include tracking receive donations, providing receipts to donors, enforcing rules regarding use of specific donations, tracking donation use, and other purposes. The present subject matter may be used to improve these known software programs by, for example, improving accuracy of data stored in the systems.

Using a machine learning model may enable an accurate processing of the donations. This may save processing resources that would otherwise be required by a multi-attempt and inaccurate method for processing the data of the donations. For example, the trained model may be used to classify received donations. Different classes may be provided based on probabilities associated with the classification. For example, three classes may be provided. A first class of a donation indicates that the donation is an approved or valid donation. A second class of a donation indicates that the donation is not an approved or invalid donation. A third class of a donation indicates that the donation needs to be further verified.

According to one embodiment, the method further comprises classifying a received donation using the trained model. The method may further comprise verifying the classification using the reduced input parameters. For example, if the received donation has the third class, it may be verified. This embodiment may be advantageous as it provides a smaller number of input parameters that need to be checked for the received donation in order to be validated or not. This may save processing resources that would otherwise be required for processing all input parameters. This may particularly be advantageous as the number of donations' attributes or parameters can be very large.

According to one embodiment, the method further comprises using the reduced input parameters and the reduced hidden neurons for further training the model. This may save processing resources compared to training the whole network while still providing accurate classifications.

According to one embodiment, ranking the weights related to the individual input parameters comprises calculating a row total of a matrix of the weights and using the row total for performing the ranking. The rows of the matrix correspond to specific input parameters and columns of the matrix correspond to specific hidden neurons.

The trained machine learning model may have a matrix of weights $w(X_n, Y_m)$ that are used between the input layer and the hidden layer, where n is the number of input parameters and m is the number of hidden neurons. The rows of the matrix are associated with respective input neurons or input parameters. The columns of the matrix are associated with respective hidden neurons of the hidden layer. The row total may be the sum of absolute values of the weights of a row of the matrix e.g. the row total of the first input neuron may be the sum of absolute values of weights of the first row. The computed row totals may be ranked and the input parameters associated with the first L ranked total rows may be selected. L may for example be user defined, e.g., L>=2.

According to one embodiment, ranking the weights related to the individual neurons comprises calculating a column total of a matrix of the weights and using the column total for performing the ranking. Rows of the matrix correspond to specific input parameters and columns of the matrix correspond to specific hidden neurons. The column total may be the sum of absolute values of the weights of a column of the matrix, e.g., the column total of the first hidden neuron may be the sum of absolute values of weights of the first column. The computed column totals may be ranked and the hidden neurons associated with the first J ranked total columns may be selected. J may for example be user defined, e.g., J>=2.

According to one embodiment, the method further comprises a model validation operation comprising calculating a first model error, introducing a perturbation into at least one of the weights, e.g., $w(X_n, Y_m)$, thereby generating a further (alternatively referred to as "second") machine learning model, calculating a second model error based on the further (or "second") machine learning model, and based on comparing the first model error and the second model error with each other, either replacing the machine learning model with the second machine learning model or keeping the current machine learning model.

For example, a perturbation may be introduced to the calculated weights of the trained machine learning model, e.g., $w(X_n, Y_m)+\varepsilon$, where $$\varepsilon = w(X_n, Y_m)\frac{X}{100},$$

x is a predefined number, e.g., $$\frac{X}{100} = 2\%.$$

The model error may be computed using the perturbated weights, thereby enabling to check if the evaluated error value is getting smaller. If so, a new fitting procedure may start using the perturbated values.

FIG. 1 is a block diagram of a system 100 illustrating a donation supply chain. The system 100 may enable (e.g., the user(s)) to execute a donation process. The system 100 comprises a donation supply input layer 101. The donation supply input layer 101 may include one or more users and other donation sources. Non-monetary donations may include medical supplies, food, and building materials. Non-monetary donations may include medical, and building and power repair services. The donation supply input layer 101 may be random and unpredictable. For example, during a disaster a large amount of people and enterprises of the donation supply input layer 101 may be willing to donate of various non-monetary materials, goods and services. A large amount of the non-monetary donations might not be of any use for the survivors. On the other hand, there might be a strong demand of a specific material, that nobody offers to provide.

The system 100 further comprises a transportation and storage layer 103. The transportation and storage layer 103 may enable to transport donations to the people in need. The transportation and storage layer 103 may include motor vehicles, e.g., trucks, airplanes, boats, trains, and various types of storage building and facilities. Warehouses of the layer 103 may be used as a buffer within the donation process. However, due to the unpredictable nature of the supply, this layer may need to be highly flexible and adjustable. For example, in case the transport cannot be realized the donation process may be affected, e.g., unsolicited donations may be refused.

The system 100 further comprises a demand layer 105. The demand layer 105 may be the important layer of the system, e.g., because the need of the survivors is the central element of the donation process. The demand layer 105 may include people and organizations in need.

The present subject matter may improve at least part of the donation process using technical means, so that the supply with adequate donations is highly optimized for the survivors to ensure those who need a donated good or service the most at that point, receive it.

Figure 2:
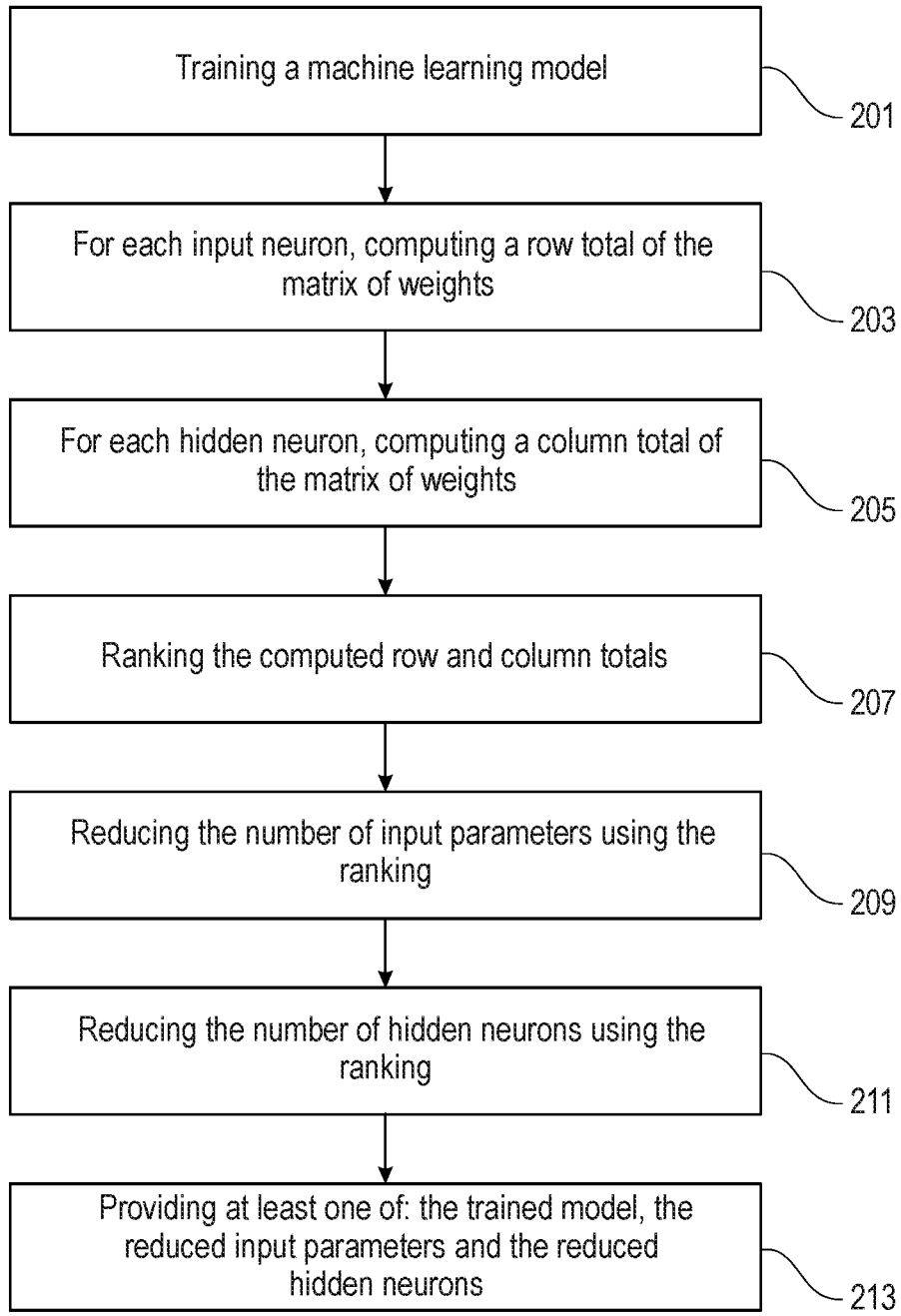
FIG. 2 is a flowchart of a method for classifying a proposed non-monetary donation in accordance with an example of the present subject matter.

FIG. 2 is a flowchart of a method for classifying a proposed non-monetary donation. The method of FIG. 2 may be at least part of the donation process. The method may enable operation of a computer system for deciding on whether or not to accept the proposed non-monetary donation.

A machine learning model may be trained in step 201. The model may for example be one of a k-nearest neighbors (K-NN) model, a support vector machines (SVM) model, a naïve Bayes classifier, a decision tree classifier, a random forest classifier, a gradient boosting classifier, or a deep neural network. In the example of FIG. 2, the machine learning model is a fully connected neural network. The machine learning model comprises input neurons arranged in an input layer. Each input neuron being operable for inputting an input value ($X_n$) of a parameter of the donation. The machine learning model further comprises at least one hidden layer comprising multiple hidden neurons. Each hidden neuron is operable for calculating a hidden layer value based on at least one input value and weights (w($X_n$, $Y_m$)) associated with the respective input neurons.

The training may be performed using a training set in accordance with a supervised machine learning model. The training set may consist of a sample of independent and identically distributed pairs, ($x_i$, $y_i$) of features vectors $x_i$ and associated labels $y_i$. The feature vector may comprise values of input parameters of a donation. For example, given a set of N training examples $\{(x_1, y_1), \ldots, (x_N, y_N)\}$ of the training set, such that $x_i$ is the feature vector of the $i^{th}$ example and $y_i$ is its label (e.g., class), a learning algorithm may seek a function g: X→Y, where X is the input space and Y is the output space. The function g is an element of a space of possible functions G, which may be called the hypothesis space. The function g may, for example, be represented using a scoring function f: X×Y→R such that g is defined as returning the y value that gives the highest score:

$$g(x) = \arg\max_y f(x, y).$$

For example, in order to measure how well a function fits the training data, a loss function L: Y×Y→R≥0 may be defined. The loss of predicting the value y, for training example ($x_i$, $y_i$), may be L($y_i$, y). The risk R(g) of function g is defined as the expected loss of g. This can be estimated from the training data using the following formula:

$$R_{emp}(g) = \frac{1}{N}\sum_i L(y_i, g(x_i)).$$

The trained model may be configured to perform a classification of donations. The classification predicts the category of the data pertaining to a prospective donation request (e.g., rejection of a donation or acceptance of a donation). The output of the trained model may vary between 1 for a donation accept, and a 0 for a donation reject. The likelihood of the decision will be given by the difference between the outcome to a value provided by the trained model. For example, a likelihood parameter (LP) may be defined as LP=1−MO, where MO is the model output. An LP value of 0 means that the model is 100% certain for a rejection of a donation. An LP value of 1 means that the model is 100% certain for an approval of a donation. An LP value of 0.5 means that the model cannot decide on a reject or an approval of a donation.

The training of the machine learning model may result in a trained model with the weights w($X_n$, $Y_m$) having specific values. For example, each hidden neuron is associated with n-max weights w ($X_1$, $Y_m$) ... w($X_{n-max}$, $Y_m$) weights and each input neuron is associated with m-max weights w($X_n$, $Y_1$) ... w($X_n$, $Y_{m-max}$). For example, the weights w($X_n$, $Y_m$) may be provided as a matrix having n-max rows associated with input neurons and m-max columns associated with hidden neurons.

For each input neuron, a row total of the matrix may be calculated in step 203. For example, for input neuron n=2, the row total may be equal to $\Sigma_{m=1}^{m-max} w(X_2, Y_m)$. This may result in n-max row totals.

For each hidden neuron, a column total of the matrix may be computed in step 205. For example, for hidden neuron m=3, the column total may be equal to $\Sigma_{n=1}^{n-max} w(X_n, Y_3)$. This may result in m-max column totals.

The row and column totals may be ranked in step 207. And based on the ranking of the row totals, the number of input parameters may be reduced in step 209. This may for example be performed by selecting the H highest ranked input parameters, e.g., H may be a user defined number, e.g., H>=1. Based on the ranking of the column totals, the number of neurons of the hidden layer may be reduced in step 211. This may for example be performed by selecting the G highest ranked hidden neurons, e.g., G may be a user defined number, e.g., G>=2.

In step 213, at least one of the trained model, the reduced input parameters, and the reduced hidden neurons may be provided for enabling the classification using the trained model. For example, the trained model may be used to classify received donations. If the classification of a received donation is uncertain, e.g., classified as third class, a verification of the donation may be performed using only the reduced input parameters instead of all input parameters.

Figure 3:
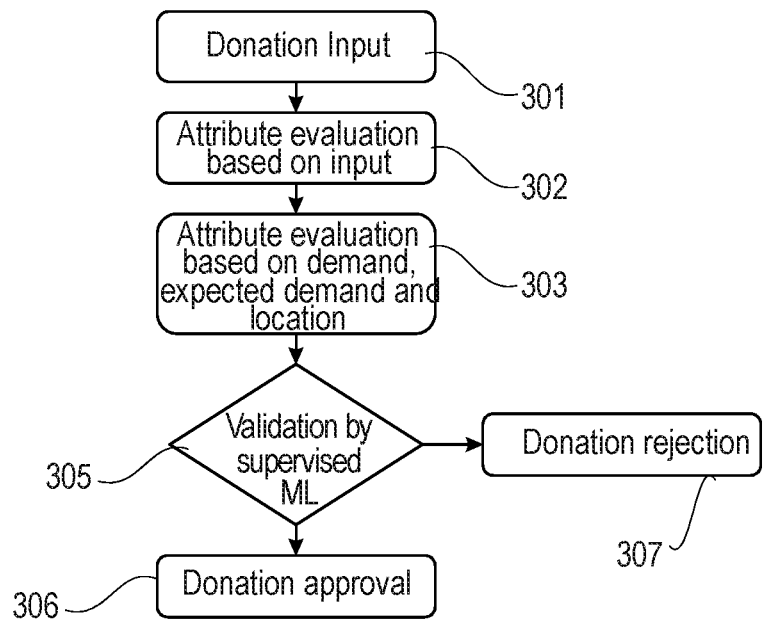
FIG. 3 is a flowchart of a method for validating a trained model in accordance with an example of the present subject matter.

FIG. 3 is a flowchart of a method for classifying a donation using the trained machine learning model in accordance with the present subject matter.

In step 301, a user may provide an input. The input of the user may be descriptive of a donation. The user input may for example be processed in step 302, e.g., using a natural language processing, to evaluate values of predefined attributes of the donation. The attributes may for example comprise a donation category attribute which may have values such as food, material, medical supply, etc. The attributes may further comprise a subcategory type attribute having values such as drinking-water, meal-boxes, chainsaws, personal protective face mask, bandage, medicine, etc. The attributes may further comprise a sub-subcategory quantity attribute having a value, such as 1,000 bottles, etc. The attributes may further comprise an attribute indicating if a transport by a donator is possible or not. The attributes may further comprise a donation origin attribute indicating, for example, the state or the city which is the origin of the donation. The granularity of the attributes can adjusted by the user depending on his or her needs.

Step 302 may, for example, result in the following values of the predefined attributes: Donation Category: Material, Type: Chainsaw, Quantity: 3, Transport possible: N, Donation Origin: Charlotte.

Using the attribute values of step 302, values of predefined additional attributes may be determined in step 303. The determination of the additional attributes may be performed based on the actual demand, the expected demand, and the geospatial origin of the donation's origin location.

The additional attributes may comprise a direct demand match (DDM) attribute. The DDM attribute may have a value of 1 if the donation directly matches an open demand; otherwise the DDM attribute may have a value of 0. The additional attributes may further comprise an expected demand match (EDM) attribute. The EDM attribute may have a value of 1 if the donation directly matches an expected or open demand; otherwise the EDM attribute may have a value of 0. The additional attributes may further comprise a transport-origin (TO) attribute. The TO attribute may be a distance (e.g., in kilometers) between the donation target and the donation origin. Step 303 may, for example, result in the following values of the additional attributes: DDM=1 (there is an open demand for chainsaws), EDM=1 (because DDM=1) and TO=349.

A feature vector may be defined by the values of the attributes provided by the user in step 301 and the additional attributes provided in step 303. The feature vector may be input to the trained machine learning model (ML) in order to provide a classification value in step 305 of the donation of the user. The classification value may for example indicate if the donation is approved (306), rejected (307) or cannot be decided between the two.

Figure 4:
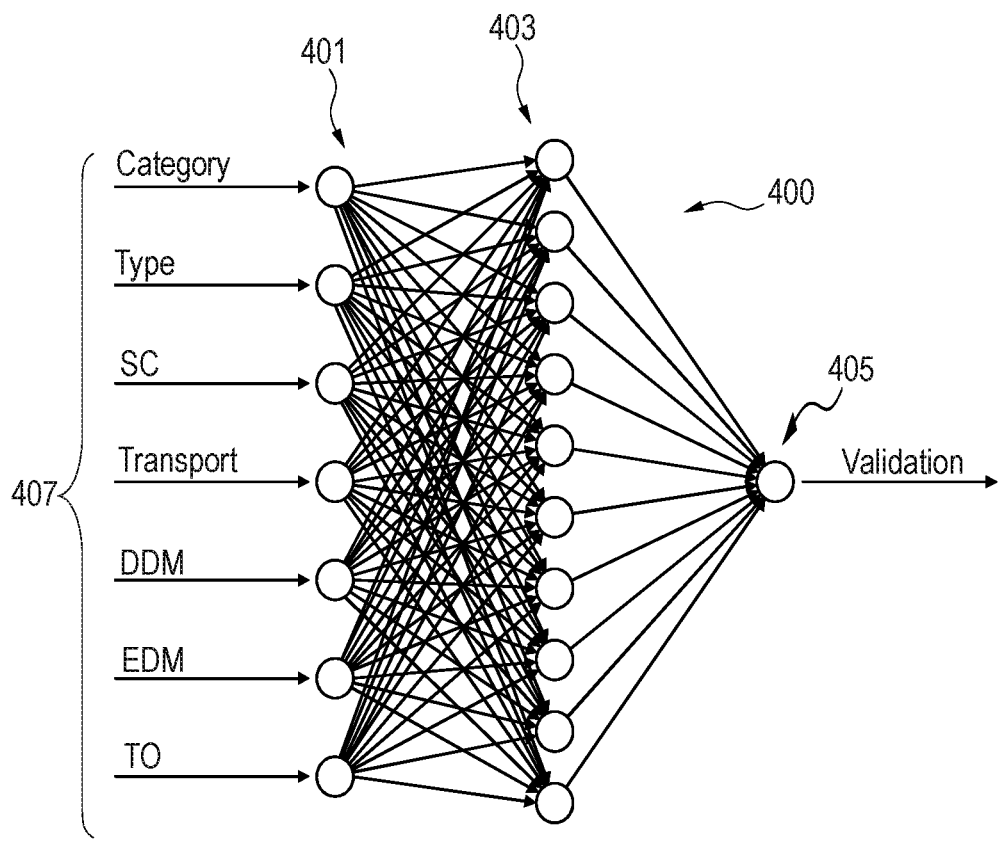
FIG. 4 is a neural network in accordance with an example of the present subject matter.

FIG. 4 shows an example machine learning model 400 in accordance with the present subject matter. The machine learning model 400 may be a neural network having an input layer 401, a hidden layer 403, and an output layer 405. The input layer 401 has seven input neurons being configured to receive values of the respective seven input parameters 407. The hidden layer 403 has ten hidden neurons and the output layer 405 has a single neuron.

The neural network 400 comprises connections between each layer. Each connection of the connections may be assigned a weight that represents its relative importance. The neural network 400 may correspond to a function y=fN (w, x) which, given a weight set w, maps an input x to an output y. The training or optimization of the neural network takes as input a sequence of training examples $(x_1, y_1), \ldots, (x_p, y_p)$ and produces a sequence of weight sets $w_1, \ldots, w_p$ starting from an initial weight set $w_0$. FIG. 5A shows an example of training data that may be used for training the neural network 400. FIG. 5A shows values of the feature vector x and associated values of the label y. The feature vector x comprises 7 attributes as described herein such as the donation category attribute, the subcategory type attribute, the quantity attribute, the attribute indicating if a transport by a donator is possible or not, the DDM attribute, EDM attribute and the TO attribute.

The weight sets $w_1, \ldots, w_p$ may be computed as follows: the weight set $w_i$ is computed using only the weight set $w_{i-1}$ of the previous iteration and the associated training example: $(x_i, y_i, w_{i-1})$ for $i=1, \ldots, p$. The computation of the weight sets is the same in each step, hence only the case i=1 is described herein. Calculating, for example, the weight set $w_1$ from $(x_1, y_1, w_0)$ is done by considering a variable weight w and applying gradient descent to the function w→E (fN (w, $x_1$), $y_1$) to find a local minimum, starting at w=$w_0$. This makes $w_1$ the minimizing weight found by gradient descent. The output of the training is then the weight set $w_p$, resulting in or defining a new function y→fN ($w_p$, x).

Figure 5B:
FIG. 5B is a matrix of weights in accordance with an example of the present subject matter.

The weights, of the resulting weight set $w_p$, which comprise weights of the connections between the input layer and the hidden layer may be provided as a matrix 510 shown in FIG. 5B. The matrix 510 has 10 columns that are associated with the 10 hidden neurons and 7 rows that are associated with the 7 input neurons or parameters of the neural network 400. For example, the first line of the matrix 510 comprises weights assigned to all connections linked to the input neuron associated with the input parameter "category", the second line of the matrix 510 comprises weights assigned to all connections linked to the input neuron associated with the input parameter "Type" and so on. A column total may be computed for each column of the 10 columns by summing up the 7 values of the weights of the column. The sum is performed using the 7 absolute values of the column A row total may be computed for each row of the 7 rows by summing up the 10 values of the weights of the row. The sum is performed using the 10 absolute values of the row.

The trained model may provide as an output the probability for a validation or an approval of a donation. Based on the values of the model output probabilities, the user can define for example the following three classes. A reject class for which the model output (MO) is ≥0% and MO<10%, an approval class for MO>90% and MO≤100%, and a manual validation class for MO≥10% and MO≤90%. The manual validation class may require a verification of the donation using only the reduced input parameters instead of all input parameters. The reduced number of input parameters may be obtained based on the ranking of the computed sums as described herein.

A random number of outputs of the model may be marked for manual verification (e.g.,1 ppm of the outputs having manual validation class). The manual validation may be to test, if the model is working as expected and to potentially gain data for retraining. For example, the data with MO≥10% and MO≤90% may also be used for a model retraining in order to improve the judgement strength of the model.

Figure 6:
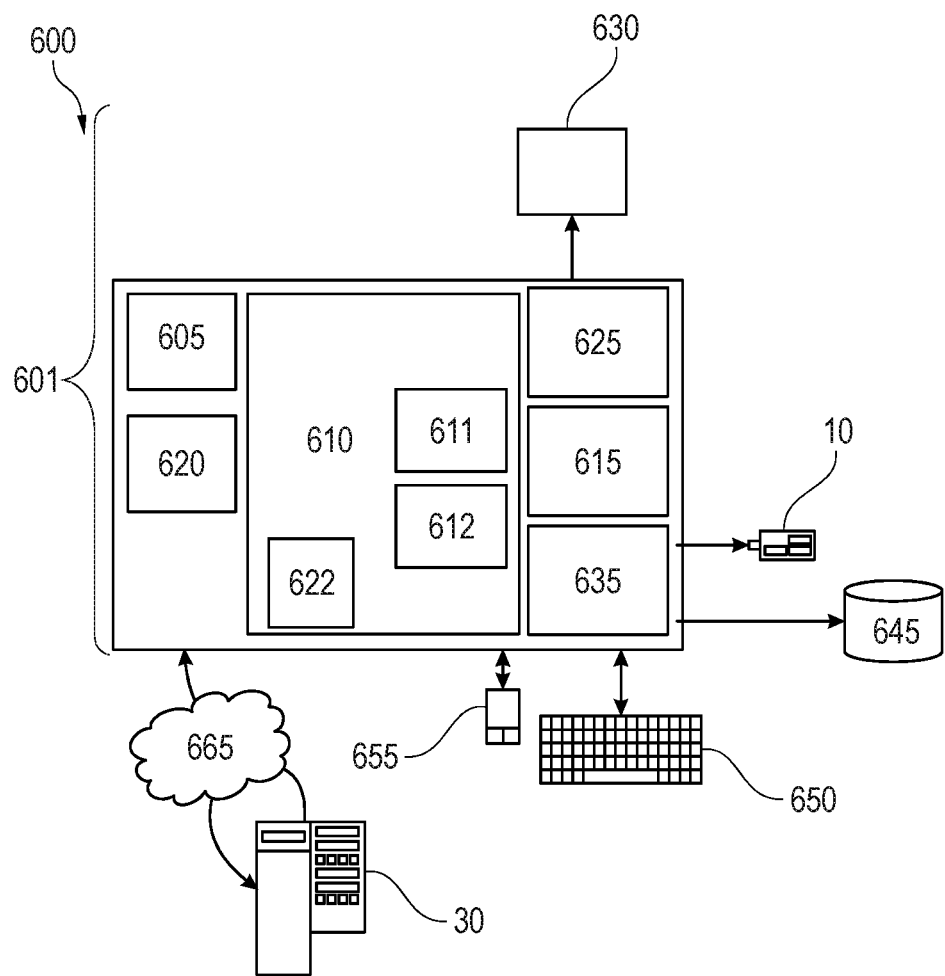
FIG. 6 represents a computerized system, suited for implementing one or more method steps as involved in the present subject matter.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, logic circuits, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art, and external storage devices.

The processor 605 is a hardware device for executing software, particularly that stored in memory 610. The processor 605 can be any custom made or commercially available processor, one or more central processing units (CPU) or cores, an auxiliary processor among several processors associated with the computer 601, a semiconductor based microprocessor (in the form of a microchip or chip set), a macroprocessor, or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), and Flash. Note that the memory 610 can have a distributed architecture, where various components are situated remotely from one another, but can be accessed by the processor 605.

The software in memory 610 may include one or more separate programs, each of which comprises an ordered listing of executable instructions for implementing logical functions, notably functions involved in embodiments of this invention. In the example of FIG. 6, software in the memory 610 includes instructions 612, e.g., program instructions for a method for classifying a proposed non-monetary donation and program instructions for a method for classifying a donation using the trained machine learning model.

The software in memory 610 shall also typically include a suitable operating system (OS) 611. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When program instructions are a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network (LAN), wide area network (WAN), metropolitan area network, Internet network, or other similar type of network environment. The network 665 may be a fixed wireless network, a wireless local area network (WLAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods, as reflected in program instructions, can be stored on any computer readable medium, such as storage 620, for use by or in connection with any computer related system or method. The storage 620 may comprise a disk storage such as HDD storage.

In one example, a method for operating a computer system for deciding on whether or not to accept a proposed non-monetary donation is provided. The method comprises training a machine learning model, the machine learning model comprising input neurons arranged in an input layer, each input neuron being operable for inputting an input value (Xn) describing a characteristic of the donation and calculating an input layer value based on the input value and on input weight (Ym), and at least one hidden layer comprising multiple hidden neurons, each hidden neuron being operable for calculating a hidden layer value based on at least one input layer value and weights (w(Xn, Yn)) associated with the respective input neurons; wherein the training comprises, eliminating a subset of the input parameters based on ranking the weights (w(Xn, Yn)) related to the individual input parameters; and eliminating a subset of the neurons of the hidden layer based on ranking the weights related to the individual neurons of that layer.

The present invention may be a system, a method, and/or a computer program product at any possible technical detail level of integration. The computer program product may include a computer readable storage medium (or media) having computer readable program instructions therein for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiberoptic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for classifying a non-monetary donation, the method comprising:

training a first machine learning model using supervised machine learning, the trained first machine learning model comprising input neurons arranged in an input layer, each input neuron being operable for inputting a value (X) of a corresponding input parameter of the non-monetary donation, and at least one hidden layer comprising multiple hidden neurons, each hidden neuron being operable for calculating a hidden layer value based on at least one value of the corresponding input parameter and first weights associated with respective input neurons, the trained first machine learning model having a total number of input parameters and a total number of hidden neurons;

generating a matrix associated with model weights, wherein rows of the matrix correspond to the respective input neurons and columns of the matrix correspond to respective hidden neurons;

calculating a row total for each row of the matrix by summing a first absolute value of each first weight in each row;

calculating a column total for each column by summing a second absolute value of each second weight in each column;

selecting, from the trained first machine learning model having the total number of input parameters and the total number of hidden neurons, a reduced number of input parameters based on ranking the row totals in the matrix and a reduced number of hidden neurons based on ranking the column totals in the matrix;

determining whether to accept the non-monetary donation or reject the non-monetary donation based on a classification of the non-monetary donation using the trained first machine learning model having the total number of input parameters and the total number of hidden neurons, wherein rejecting the non-monetary donation includes refusing to accept the non-monetary donation for any donation recipient;

in response to the classification, using the trained first machine learning model having the total number of input parameters and the total number of hidden neurons, being an uncertain classification as to accepting the non-monetary donation or rejecting the non-monetary donation, verifying the uncertain classification of the non-monetary donation by processing the selected reduced number of input parameters without processing any unselected input parameters using the trained first machine learning model having the selected reduced number of hidden neurons and excluding any unselected hidden neurons to obtain a second classification; and retraining the trained first machine learning model having the total number of input parameters and the total number of hidden neurons using the second classification.

2. The method of claim 1, further comprising:
performing a model validation operation, wherein the model validation operation comprises:
calculating a first model error associated with the trained first machine learning model having the total number of input parameters and the total number of hidden neurons;
introducing a perturbation into at least one of the first and second weights of the trained first machine learning model to generate a second machine learning model;
calculating a second model error based on the second machine learning model; and
comparing the first model error and the second model error to determine whether to replace the trained first machine learning model with the second machine learning model or keep the trained first machine learning model.

3. A computer program product for classifying a non-monetary donation, comprising one or more computer-readable storage media and program instructions stored on at least one of the one or more computer-readable storage media, the program instructions executable by a processor, the program instructions comprising:
program instructions to train a first machine learning model using supervised machine learning, the trained first machine learning model comprising input neurons arranged in an input layer, each input neuron being operable for inputting a value ($X_n$) of a corresponding input parameter of the non-monetary donation, and at least one hidden layer comprising multiple hidden neurons, each hidden neuron being operable for calculating a hidden layer value based on at least one value of the corresponding input parameter and first weights associated with respective input neurons, the trained first machine learning model having a total number of input parameters and a total number of hidden neurons;
program instructions to generate a matrix associated with model weights, wherein rows of the matrix correspond to the respective input neurons and columns of the matrix correspond to respective hidden neurons;
program instructions to calculate a row total for each row of the matrix by summing a first absolute value of each first weight in each row;
program instructions to calculate a column total for each column by summing a second absolute value of each second weight in each column;
program instructions to select, from the trained first machine learning model having the total number of input parameters and the total number of hidden neurons, a reduced number of input parameters based on ranking the row totals in the matrix and a reduced number of hidden neurons based on ranking the column totals in the matrix;
program instructions to determine whether to accept the non-monetary donation or reject the non-monetary donation based on a classification of the non-monetary donation using the trained first machine learning model having the total number of input parameters and the total number of hidden neurons, wherein rejecting the non-monetary donation includes refusing to accept the non-monetary donation for any donation recipient;
in response to the classification, using the trained first machine learning model having the total number of input parameters and the total number of hidden neurons, being an uncertain classification as to accepting the non-monetary donation or rejecting the non-monetary donation, program instructions to verify the uncertain classification of the non-monetary donation by processing the selected reduced number of input parameters without processing any unselected input parameters using the trained first machine learning model having the selected reduced number of hidden neurons and excluding any unselected hidden neurons to obtain a second classification; and
program instructions to retrain the trained first machine learning model having the total number of input parameters and the total number of hidden neurons using the second classification.

4. The computer program product of claim 3, wherein the program instructions further comprise program instructions to perform a model validation operation, wherein the model validation operation comprises:
calculating a first model error associated with the trained first machine learning model having the total number of input parameters and the total number of hidden neurons;
introducing a perturbation into at least one of the first and second weights of the trained first machine learning model to generate a second machine learning model;
calculating a second model error based on the second machine learning model; and comparing the first model error and the second model error to determine whether to replace the trained first machine learning model with the second machine learning model or keep the trained first machine learning model.

5. A computer system for classifying a non-monetary donation, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system executes the program instructions to perform a method comprising:
training a first machine learning model using supervised machine learning, the trained first machine learning model comprising input neurons arranged in an input layer, each input neuron being operable for inputting a value ($X_n$) of a corresponding input parameter of the non-monetary donation, and at least one hidden layer comprising multiple hidden neurons, each hidden neuron being operable for calculating a hidden layer value based on at least one value of the corresponding input parameter and first weights associated with respective input neurons, the trained first machine learning model having a total number of input parameters and a total number of hidden neurons;
generating a matrix associated with model weights, wherein rows of the matrix correspond to the respective input neurons and columns of the matrix correspond to respective hidden neurons;
calculating a row total for each row of the matrix by summing a first absolute value of each first weight in each row;
calculating a column total for each column by summing a second absolute value of each second weight in each column;
selecting, from the trained first machine learning model having the total number of input parameters and the total number of hidden neurons, a reduced number of input parameters based on ranking the row totals in the matrix and a reduced number of hidden neurons based on ranking the column totals in the matrix;
determining whether to accept the non-monetary donation or reject the non-monetary donation based on a classification of the non-monetary donation using the trained first machine learning model having the total number of input parameters and the total number of hidden neurons, wherein rejecting the non-monetary donation includes refusing to accept the non-monetary donation for any donation recipient;
in response to the classification, using the trained first machine learning model having the total number of input parameters and the total number of hidden neurons, being an uncertain classification as to accepting the non-monetary donation or rejecting the non-monetary donation, verifying the uncertain classification of the non-monetary donation by processing the selected reduced number of input parameters without processing any unselected input parameters using the trained first machine learning model having the selected reduced number of hidden neurons and excluding any unselected hidden neurons to obtain a second classification; and
retraining the trained first machine learning model having the total number of input parameters and the total number of hidden neurons using the second classification.

6. The computer system of claim 5, further comprising:
performing a model validation operation, wherein the model validation operation comprises:
calculating a first model error associated with the trained first machine learning model having the total number of input parameters and the total number of hidden neurons;
introducing a perturbation into at least one of the first and second weights of the trained first machine learning model to generate a second machine learning model;
calculating a second model error based on the second machine learning model; and
comparing the first model error and the second model error to determine whether to replace the trained first machine learning model with the second machine learning model or keep the trained first machine learning model.

* * * * *